United States Patent
Zangara et al.

(10) Patent No.: US 7,848,492 B1
(45) Date of Patent: Dec. 7, 2010

(54) SYSTEM AND METHOD FOR TESTING THE DISPATCH FUNCTIONALITY OF A COMMUNICATIONS NETWORK

(75) Inventors: Joseph M. Zangara, Haymarket, VA (US); Arsalan S. Mehmood, Arlington, VA (US); Nathan D. Klonoski, Rockville, MD (US)

(73) Assignee: Nextel Communications Inc., Reston, VA (US)

( * ) Notice: Subject to any disclaimer, the term of this patent is extended or adjusted under 35 U.S.C. 154(b) by 1260 days.

(21) Appl. No.: 11/411,542

(22) Filed: Apr. 26, 2006

(51) Int. Cl.
*H04M 1/24* (2006.01)
(52) U.S. Cl. .................. 379/21; 455/507; 455/509; 370/279; 370/327
(58) Field of Classification Search .................. 379/21; 370/279, 327; 455/507, 509
See application file for complete search history.

(56) References Cited

U.S. PATENT DOCUMENTS 5,408,466 A * 4/1995 Ablay ..................... 370/278

* cited by examiner

*Primary Examiner*—Simon Sing
*Assistant Examiner*—Simon King

(57) ABSTRACT

Dispatch communication testing may be automated by actuating an electrically-controlled switch coupled to an initiating dispatch device to automatically generate dispatch test events. In one embodiment, user-defined test parameters may be used to determine exactly when the switch is to be actuated. The resulting test events may then be recorded and compared to corresponding recognized dispatch events, where the recognized dispatch events are those dispatch activities that were actually carried out by either the initiating dispatch device or a target dispatch device. One or more performance characteristic for the initiating dispatch device and/or the dispatch communication network may then be determined based on a result of the comparison.

31 Claims, 8 Drawing Sheets

US 7,848,492 B1

SYSTEM AND METHOD FOR TESTING THE DISPATCH FUNCTIONALITY OF A COMMUNICATIONS NETWORK

FIELD OF THE INVENTION

The present invention relates in general to dispatch networks, and in particular to testing the dispatch functionality of a communications network.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a walkie-talkie type of call such as the dispatch call service marketed by Sprint Nextel Corporation under the trade name Direct Connect.

One distinguishing characteristic of dispatch communications compared to interconnect communications is immediacy. Specifically, dispatch calls can be setup between a source and destination much quicker than interconnect calls. Typically, a dispatch call is initiated by a user depressing a push-to-talk (PTT) button on, or connected to, a mobile station (e.g. a dispatch-capable cellular phone). The requesting mobile station then sends a call request, via a dispatch network, to the intended recipient mobile station. If the recipient mobile station is powered on, it will send an acknowledgment back to the requesting mobile station via the dispatch network. The requesting mobile station will then indicate to the user of the requesting mobile station that the user may begin speaking while depressing the PTT call button. The resulting call is half-duplex. That is, at any time during the call, one mobile station may be transmitting while the other mobile station is receiving. After a mobile unit is finished transmitting, it sends an end-of-transmission (EOT) signal to the other mobile unit, indicating that the channel is open and that the other mobile unit may begin transmitting.

The characteristics of a dispatch network (e.g. capacity, propagation delay, bandwidth, cell coverage, etc.), as well as the dispatch hardware, are currently tested in part by manually pressing and releasing the PTT call button on a dispatch mobile station, causing the dispatch mobile station to transmit, through the dispatch network, dispatch call requests, voice data or EOT signals to one or more target dispatch mobile units. The PTT call button press and release times are compared to the reception times of the resulting transmission by the target dispatch mobile units. This method of testing can be costly, unreliable, and prone to human error since it requires a person to manually press and release the PTT call button and record the times at which it is pressed or released. Thus, there is a need in the art for an improved approach to testing dispatch hardware and/or dispatch network functionality.

BRIEF SUMMARY OF THE INVENTION

Systems and methods for testing the dispatch functionality of a communication network are disclosed and claimed herein. In one embodiment, a method for automating dispatch communication testing includes storing user-defined test parameters, actuating a switch coupled to an initiating dispatch device to automatically generate dispatch test events in accordance with the test parameters, and recording data representative of the automatically generated dispatch test events. The method further includes comparing the recorded data to corresponding recognized dispatch events, and determining a performance characteristic of the initiating dispatch device and/or a communication network based on such comparison.

Other aspects, features, and techniques of the invention will be apparent to one skilled in the relevant art in view of the following detailed description of the invention.

DETAILED DESCRIPTION OF EXEMPLARY EMBODIMENTS

Figure 1:
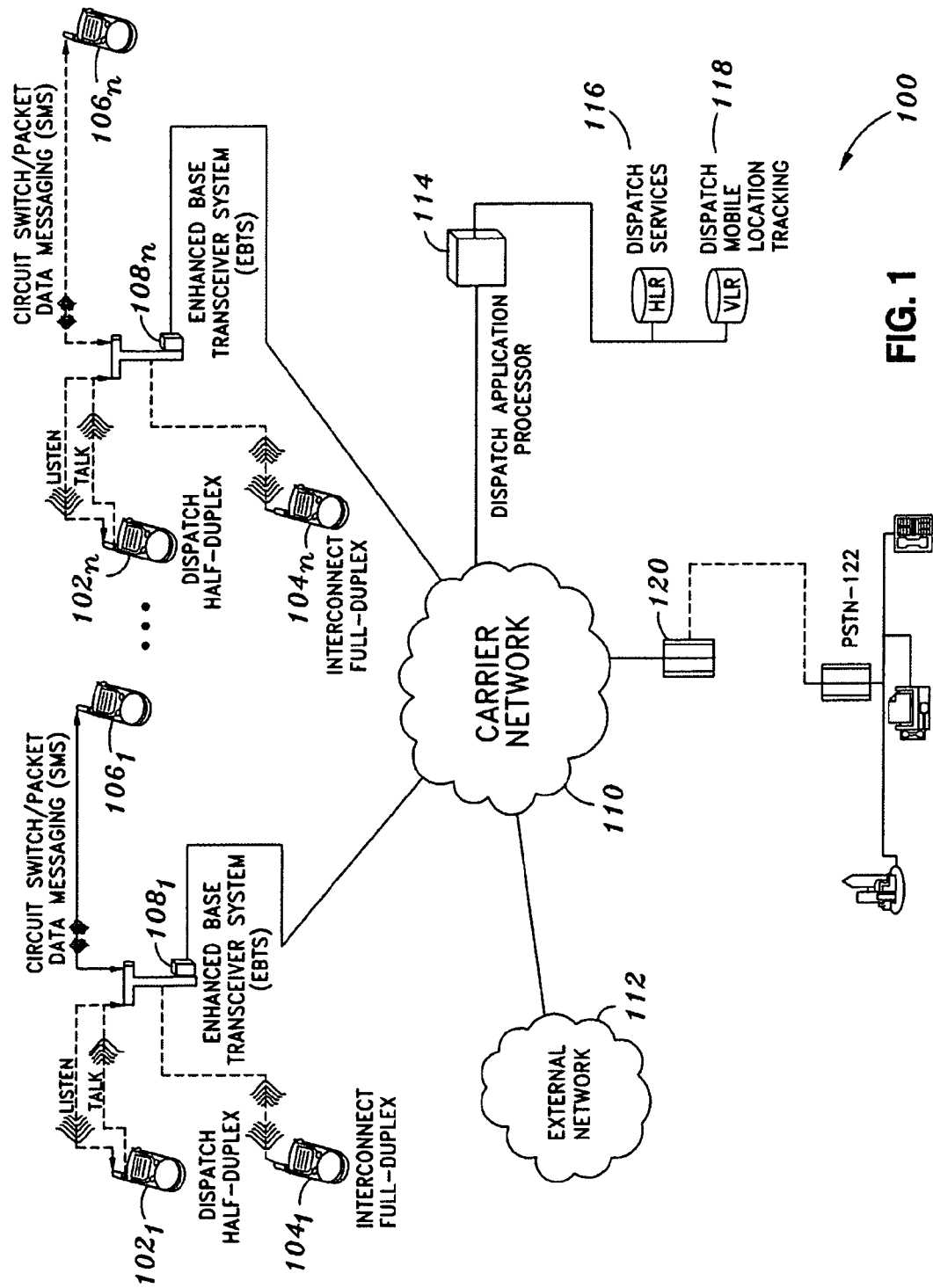
FIG. 1 depicts one embodiment of a system diagram of an exemplary communications system that may be used in conjunction with one or more aspects of the invention.

One aspect of the invention is to provide a method for automating dispatch communication testing which includes storing user-defined test parameters, and actuating a switch coupled to an initiating dispatch device to automatically generate dispatch test events in accordance with those test parameters. In certain embodiments, data representative of the generated dispatch test events may be recorded and compared to corresponding recognized dispatch events. In addition, performance characteristic for the initiating dispatch device and/or a communication network may then be determined based on a result of the comparison.

In certain embodiment, the test parameters may include one or more of a switch-close duration, a switch-open duration and a number of iterations, where the switch-close duration represents how long the switch is to be held closed, and the switch-open duration represents how long the switch is to be held open.

The aforementioned switch may be actuated by providing a first control signal to close the switch for a first period of time which is based on the test parameters, where closing the switch causes the initiating dispatch device to transmit a dispatch call request and/or voice data over a communication network to a target dispatch device. The switch may be further actuated by a second control signal to be opened for a second period of time which is based on the test parameters. In one embodiment, opening the switch causes the initiating dispatch device to transmit an end-of-transmission signal over the communication network to a target dispatch device.

Another aspect of the invention is to record data which includes timestamp information of when the aforementioned dispatch test events actually occurred. This data may then be compared to the recognized dispatch events, which in one embodiment includes a set of dispatch activities performed by the dispatch device in response to actuation of the switch. If there is a match between the recorded data and the recognized data, this may be indicative that the initiating dispatch device is functioning properly.

Alternatively, the recognized dispatch events may include a set of dispatch activities recorded by a target dispatch device as a result of transmission from the initiating dispatch device. In this case, comparing the aforementioned recorded test data to the recognized dispatch events of the target dispatch device may be used to determine performance characteristics of the communication network being used.

Another aspect of the invention is to automate the testing of dispatch communication network by actuating a switch coupled to a plurality of initiating dispatch devices connected in parallel to automatically generate dispatch test events in accordance with pre-defined test parameters. In certain embodiments, data representative of the generated dispatch test events may be recorded and compared to corresponding recognized dispatch events. In one embodiment, the plurality of initiating dispatch devices are configured as a bank of initiating devices and the dispatch test events are directed at a bank of target devices.

Alternatively, the dispatch communication network may be tested by actuating a plurality of switches coupled to a plurality of initiating dispatch devices to automatically generate the dispatch test events in accordance with the pre-defined test parameters. It should be appreciated that only one initiating dispatch device may be coupled to each of the plurality of switches, or alternatively, a plurality of initiating dispatch devices may be connected in parallel to each of the I plurality of switches. Thus, a testing unit and/or procedure of the invention may involve either a single control signal to generate a plurality of dispatch events using a plurality of initiating dispatch devices, or multiple control signals to control a plurality of switches to generate the plurality of dispatch events using the plurality of initiating dispatch devices.

Referring now to the figures, FIG. 1 illustrates a block diagram of an exemplary communication system 100 capable of being used in conjunction with one or more aspects of the invention. In one embodiment, the communication system 100 is an iDEN system, such as the iDEN network owned and operated by Sprint Nextel Corporation of Reston, Va. As shown in FIG. 1, the communication system 100 serves a plurality of dispatch subscriber units $102_1$-$102_n$ ("102"), a plurality of interconnect subscriber units $104_1$-$104_n$ ("104"), and a plurality of SMS subscriber units $106_1$-$106_n$ ("106") (collectively, "subscriber units 102-106"), all of which may communicate with a plurality of local base stations $108_1$-$108_n$ ("108").

In the case of dispatch subscriber units 102, base stations 108 may provide half-duplex voice service, thereby allowing users to communicate with each other (or with external entities) by way of half-duplex voice. In the case of interconnect subscriber units 104, base stations 108 may provide full-duplex voice service, thereby allowing users to communicate with each other (or with external entities) by way of full-duplex voice. And in the case of SMS subscriber units 106, base stations 108 may allow users to transmit circuit switch/packet data with each other (or with external entities). The subscriber units are the end-user interface to the communication network 100. It should be appreciated that subscriber units 102-106 may be comprised of phones, pagers, modems, mobile transceivers, personal digital assistants, end-user base transceivers, or similar devices capable of communicating over the carrier network 110. Subscriber units 102-106 may be capable of dispatch calling, interconnect calling, roaming, message mail and/or data communications.

Base stations 108 may be comprised of base station radios and control equipment contained in an Enhanced Base Transceiver System (EBTS), or cell site. Such cell sites may be used to provide the RF link between the carrier network 110 and the various subscriber units 102-106. Cell sites may further provide connectively between subscriber units 102-106 and an external network 112. The external network 112 may be the Internet, a wide area network (WAN), a local area network (LAN), an intranet, or other type of packet-switch network. In another embodiment, external network 112 may be another carrier network.

As depicted in FIG. 1, communication system 100 further includes a Dispatch Application Processor (DAP) 114. In one embodiment, the DAP 114 may coordinate and control dispatch and packet data services. Moreover, the DAP 114 may provide first-time registration for all interconnect and dispatch subscribers, as well as maintenance and tracking of subscriber mobility for dispatch and packet data.

The Dispatch Home Location Register (D-HLR) 116 is a database that stores information about dispatch access rights and features allocated to each dispatch subscriber unit 102. The D-HLR 116 may be queried each time a dispatch call is initiated or call features requested, which may function as a subscriber access control mechanism. For each dispatch subscriber unit 102, the D-HLR database 116 may contain an International Mobile Equipment Identifier (IMEI), a billing number or International Mobile Subscriber Identity (IMSI), as well as other dispatch-related group and fleet ID information. Additional individual service provider policies and procedures may also be contained in the D-HLR 116.

Continuing to refer to FIG. 1, the communication system 100 is further depicted as including a DAP-Visited Location Register (D-VLR) 118. In one embodiment, the D-VLR 118 is a Random Access Memory (RAM) resident database that contains the most recent location information on each dispatch subscriber unit 102. As a dispatch subscriber unit 102 moves out of an area, it will report its new location to the DAP, which in turn may update the D-VLR 118. In one embodiment, the D-VLR 118 may contain the identification data for the subscriber unit in question, as well as subscriber data and the current status of the subscriber unit.

As shown in FIG. 1, the communication system 100 may further include a subscriber switching center (MSC) 120 which provides interconnect services. The MSC 120 may function as the interface between the carrier network 110 and other service provider's public switch telephone networks (PSTN) 122, the details of which are beyond the scope of this disclosure.

Figure 2:
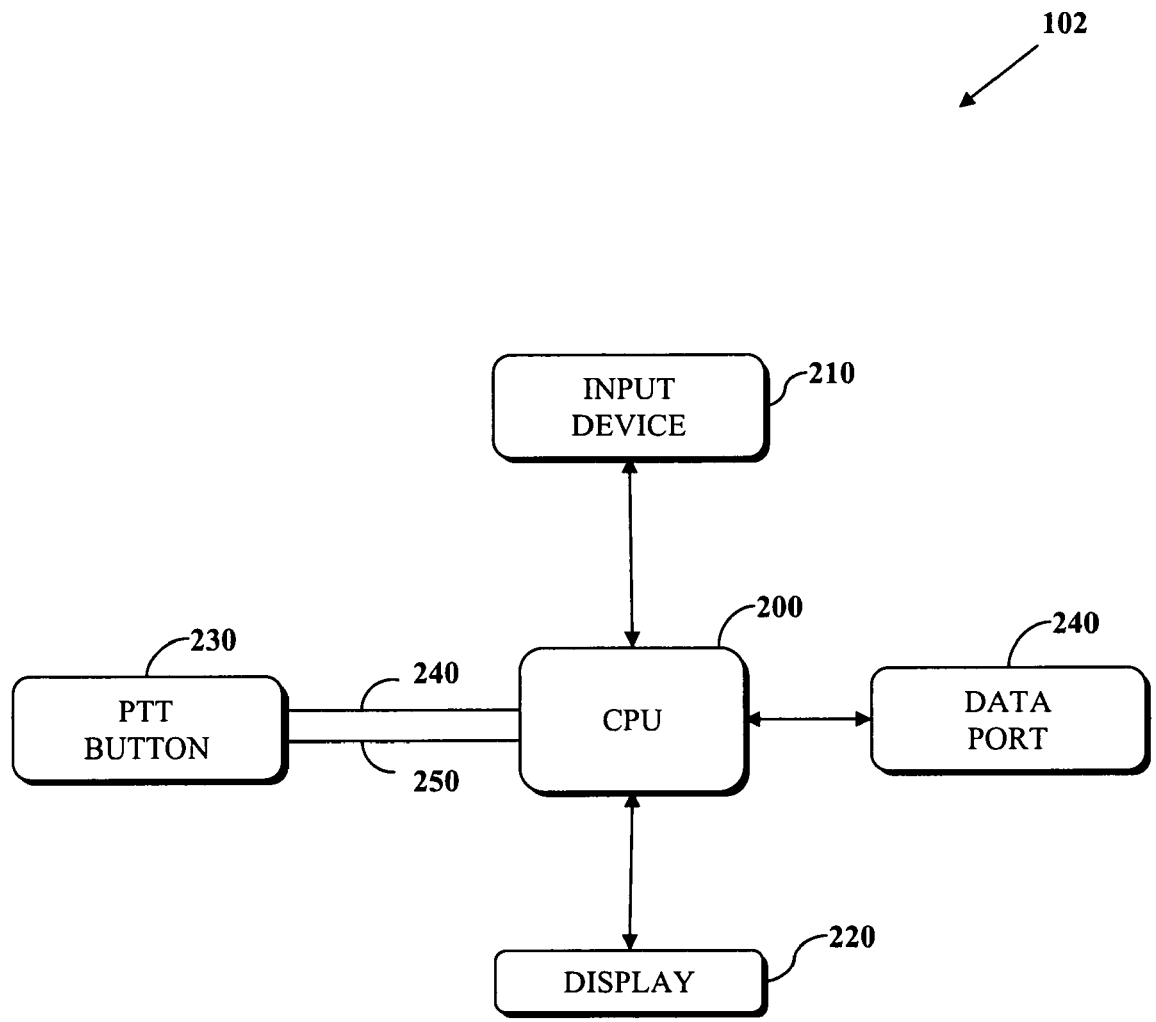
FIG. 2 is a simplified schematic diagram of a traditional push-to-talk activation circuit of a dispatch mobile unit.

FIG. 2 is a simplified schematic of a typical dispatch subscriber unit 102. As shown in FIG. 2, a PTT call button 230 is coupled to the central processing unit (CPU) 200 of the dispatch subscriber unit 102 by electrical connections 240 and 250. It should be appreciated that the PTT call button 230 may be external to the dispatch subscriber unit 102 (e.g. a PTT call button on a hands free ear-piece), or may be integrated into the dispatch subscriber unit 102 (e.g. a PTT call button mounted on the side of a cellular phone). It should further be appreciated that in certain embodiments, an external wireless PTT call button 230 may not be coupled to CPU 200 by electrical connections 240 and 250 but instead communicate wirelessly with a normally-open (NO) switch which in turn is coupled to CPU 200 by electrical connections 240 and 250 (e.g. a PTT call button on a wireless hands-free earpiece).

Typically a PTT call button 230 includes a momentary NO switch. When the PTT call button 230 is depressed by a user of the dispatch subscriber unit 102, electrical connections 240 and 250 are shorted together by the NO switch, or in the case of a wireless PTT call button, electrical connections 240 and 250 are shorted together by another NO switch in communication with the PTT call button. The shorting together of electrical connections 240 and 250 is detected by CPU 200 which may in turn cause an initiating dispatch subscriber unit 102 to transmit, over a communication network (e.g., communications network 100), a dispatch call request or voice data to one or more target dispatch subscriber units 102.

FIG. 2 also depicts the CPU 200 as being electrically coupled to an input device 210 and a display 220. While in one embodiment, the input device 210 may be a keypad or other collection of buttons, virtually any type of input means may be used (e.g., voice command, etc.). The input device 210 may be usable to initiate and receive dispatch and other types of calls. Input device 210 may further be used to enter a subscriber unit number (e.g., a phone number) to place a call to one or more target subscriber units. Similarly, display 220 (e.g., liquid crystal display, etc.) may be used to display information relating to one or more dispatch and/or other types of calls being initiated from or targeting the dispatch subscriber unit 102. Finally, FIG. 2 depicts the dispatch subscriber unit 102 as having a data port 240 in communication with the CPU 200. That is, typical dispatch subscriber units 102 will have a single data port to enable data transfer to and from the dispatch subscriber units 102.

As previously mentioned, communication network dispatch functionality is currently tested by manually pressing and releasing the PTT call button 230, thereby causing an initiating dispatch subscriber unit 102 to transmit, over the communication network, dispatch call requests, voice data or EOT signals to one or more target dispatch subscriber units. The timestamps of each such dispatch event is recorded using a data connection to the dispatch unit's data port 240. Since virtually all dispatch subscriber units have a single data port, and since the data port is occupied by the need to record the exact time when the manual dispatch events take place, it has been necessary to test both the dispatch subscriber units themselves, as well as the dispatch functionality of the communications network, by manually depressing the unit's PTT call button. However, this is a laborious and inefficient approach.

Figure 3A:
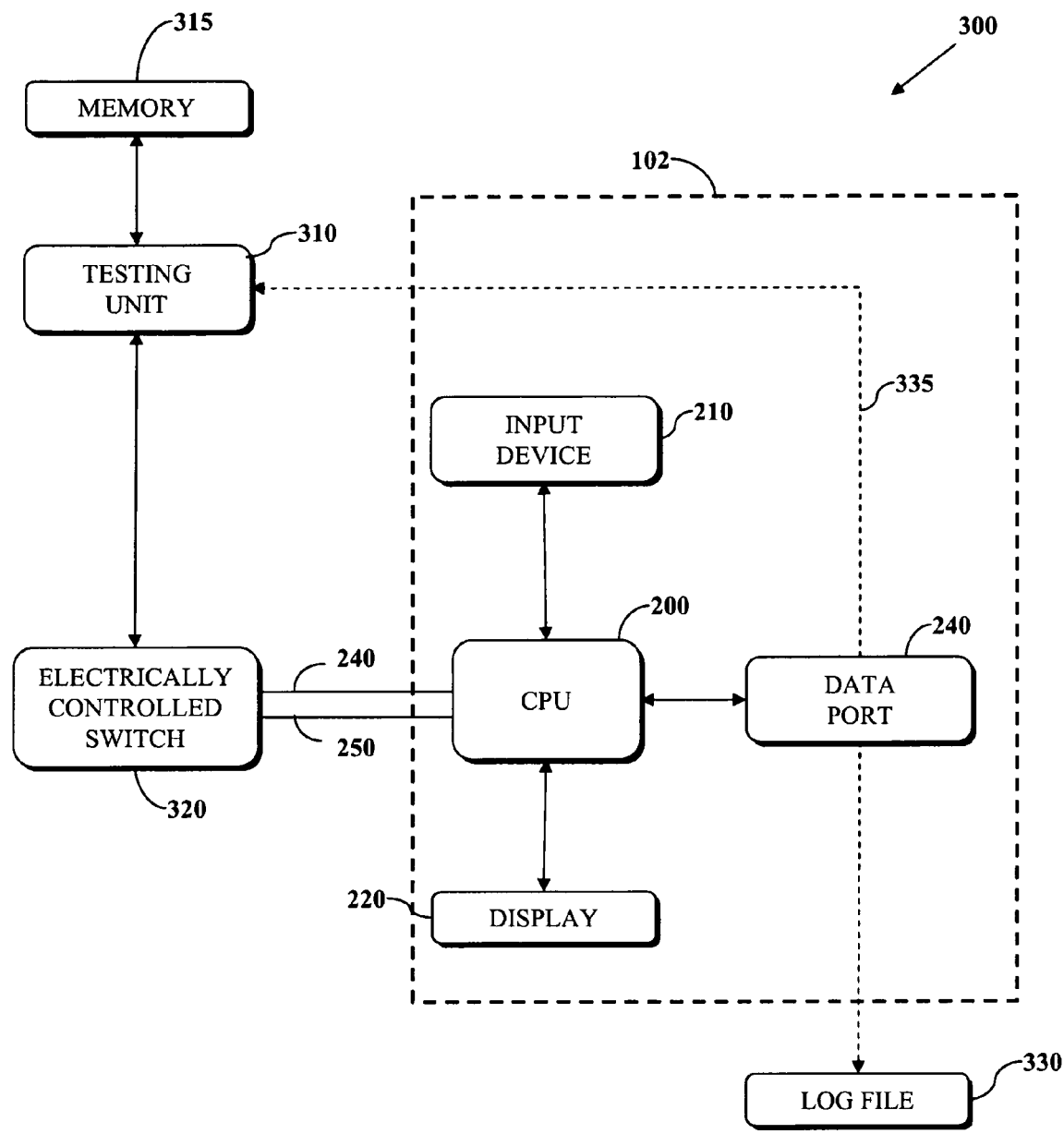
FIG. 3A depicts a simplified system diagram of a dispatch network test system, in accordance with one or more embodiments of the invention.

To that end, FIG. 3A depicts one embodiment of a testing system 300 which may be used to automate the testing of the dispatch functionality of a communication network and/or the dispatch hardware itself. In particular, using system 300 the dispatch functionality of a communication network (e.g., communication system 100) and/or the dispatch hardware (e.g., dispatch subscriber unit 102) may be tested by programming a testing unit 310 to generate a series of dispatch test events that are comprised of closing and opening the electrically-controlled switch 320, which in turn causes the dispatch subscriber unit 102 to transmit, over the dispatch network, dispatch call requests, voice data, or EOT signals to one or more target dispatch subscriber devices. It should be appreciated that one or more dispatch access number(s) may need to be supplied to the initiating dispatch subscriber unit 102 before activating the electrically-controlled switch 320.

System 300 may be created by removing the PTT call button 230 of the dispatch subscriber unit 102 of FIG. 2 and replacing it with an electrically-controlled switch 320, which is then controlled by testing unit 310. In certain embodiments, the PTT call button 230 may be replaced with the electrically-controlled switch 320 by removing or detaching PTT call button 230 from the dispatch subscriber unit 102 and attaching electrically-controlled switch 320 to the electrical terminals or wires used to connect PTT call button 230 to electrical connections 240 and 250. In embodiments where PTT call button 230 is a wireless PTT call button in communication with a NO switch that is coupled to CPU 200, it may be replaced by an electrically-controlled switch 320 that is capable of communicating with the NO switch or by removing the NO switch and attaching electrically-controlled switch 320 to the electrical terminals or wires used to connect the NO switch to electrical connections 240 and 250. It should equally be appreciated that numerous other configurations may be used to implement one or more aspects of the invention.

It should be appreciated that the testing unit 310 may be any device containing a central processing unit (not shown) and a memory 315 that may be programmed to open or close switch 320 (i.e., produce dispatch test events) by transmitting control signals to electrically-controlled switch 320. In addition, testing unit 310 may be a dedicated system or a general purpose system. In one embodiment, testing unit 310 may be a desktop computer, laptop computer, embedded computer, personal digital assistant (PDA), programmable logic controller (PLC), programmable logic device (PLD), application specific integrated circuit (ASIC), or microcontroller. It should be appreciated that the above list is for exemplary purposes only and should not be considered limiting on the current invention. Switch 320 may be a switch that is opened or closed in response to a corresponding control signal from a testing unit 310. It may consist of a switching element (e.g. relay, optical isolator, etc.) coupled to a drive circuit, wherein the drive circuit is configured to receive a control signal and open or close the switching element in response to the control signal. The drive circuit may be a purely analog circuit, or it may contain one or more digital components to decode the control signals.

In certain embodiments, switch 320 may be external to testing unit 310. In these embodiments, control signals may be transmitted from testing unit 310 to switch 320 over a wired link, wireless link, or combination thereof. In other embodiments, switch 320 and testing unit 310 may be an integrated unit, such as a PLC containing a switching element.

Testing unit 310 may be coupled to a display (not shown) for providing a user interface, and one or more input devices (e.g. keyboard, mouse) whereby test parameters may be entered into testing unit 310 and stored in its memory 315. In other embodiments, testing unit 310 may be pre-programmed with a set of test parameters. Such test parameters may include a switch-close duration, a switch-open duration and/or a number of iterations. Test parameters may be used by testing unit 310 to open and close electrically-controlled switch 320, and thus cause an initiating dispatch subscriber unit 102 to transmit dispatch call requests, voice data or EOT signals to one or more target dispatch subscriber units.

As previously mentioned, testing unit 310 may also include a memory 315 for storing the user-defined test parameters. In addition, however, this memory 315 also may be used for storing dispatch testing event data. For example, each time the testing unit 310 opens or closes the switch 320 in accordance with the user-defined test parameters, information relating to the time of the event, as well as the particular testing event that occurred, may be recorded in the memory 315. As will be explained in more detail below, the testing event information stored in memory 315 may then be compared to corresponding test data recorded by the dispatch subscriber unit 102 itself.

Continuing to refer to FIG. 3A, in certain embodiments the data port 240 may be used to generate a log file 330 containing entries for each recognized dispatch test event caused by the testing unit 310. Alternatively, the data port 240 may be connected to testing unit 310 itself and may provide dispatch event data 335 to the testing unit 310 (e.g., to be stored in memory 315), where the data 335 indicates each dispatch test event actually recognized by the dispatch subscriber unit 102. In either case, timestamp information or other data for each recognized dispatch test event may be recorded using the system 300. In the present discussion, recognized dispatch test events will refer to activations of switch 320 that simulate and are accurately recognized as PTT button presses by the applicable dispatch hardware.

The resulting dispatch test event log, whether stored in the testing unit 310 itself or in the separate log file 330, may then be used to verify that the dispatch subscriber unit 102 in question is functioning correctly. That is, the log file 330 (or the data provided to the testing unit through the data port 240) may be compared against the dispatch test event data stored in the memory 315 of the testing unit 310, as described above. In one embodiment, any discrepancies in this data comparison may be indicative of a malfunctioning dispatch subscriber unit 102.

Figure 3B:
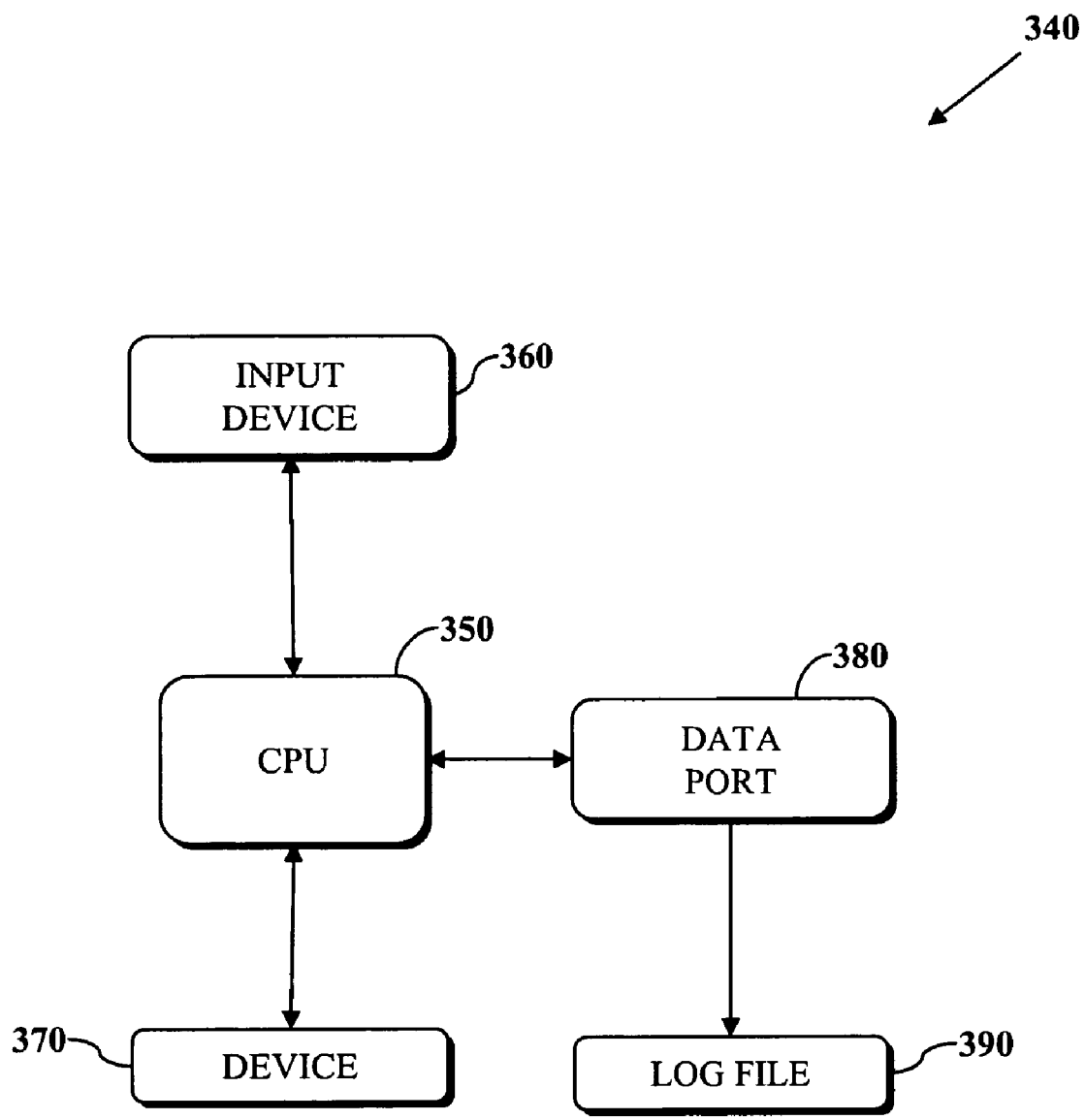
FIG. 3B depicts a simplified system diagram of a target dispatch device, in accordance with one or more embodiments of the invention.

In addition to testing the dispatch subscriber unit 102 itself, system 300 may also be used to test the dispatch functionality of a communication network. To that end, FIG. 3B depicts one embodiment of a target dispatch subscriber unit 340. As with unit 102, target unit 340 includes a CPU 350 electrically connected to an input device 360 and a display 370. In addition, target dispatch subscriber unit 340 includes a data port 380 usable to generate a target log file 390, which may be similar to the log file 330 of FIG. 3A.

As previously mentioned, system 300 of FIG. 3A is usable to test the dispatch functionality of a communication network (e.g., communication system 100). As will be described in more detail below with reference to FIG. 5, this may be done by entering the dispatch access number of the target dispatch subscriber unit 340 into the initiating subscriber unit 102 of system 300. Thereafter, one or more dispatch test events may be generated by the testing unit 310 and stored in memory 315 or log file 330. This dispatch test event data may then be compared to the corresponding dispatch events that are recognized by the target dispatch subscriber unit 340, as recorded in log file 390. In one embodiment, this means the reception times recorded in the target log file 390 may be compared with corresponding switch-open and switch-close durations recorded either in log file 330 or in memory 315. Such a comparison could then be used to determine network efficiency, capacity, propagation delay, bandwidth, cell coverage and the like.

Figure 3C:
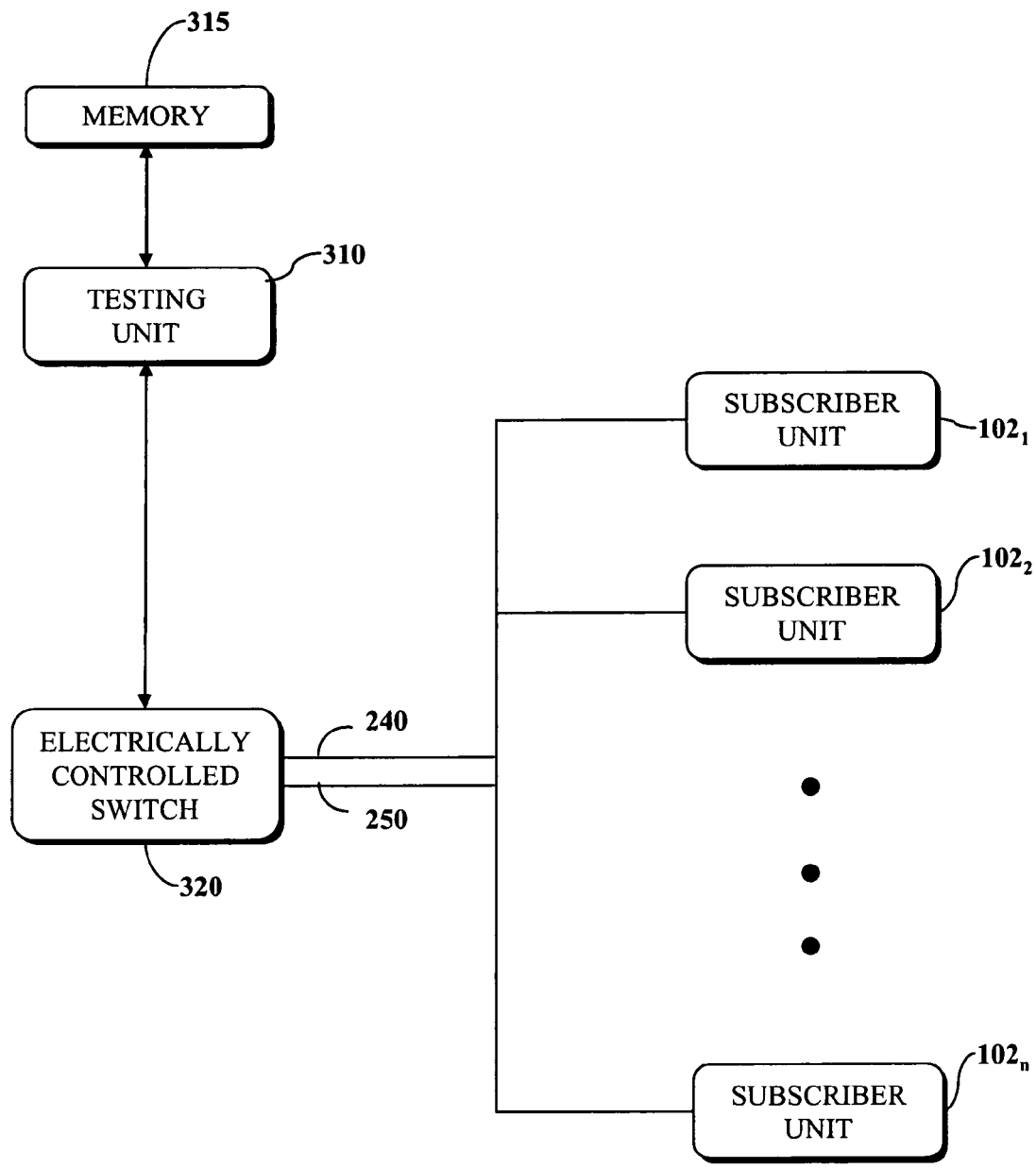
FIG. 3C depicts another embodiment of the dispatch network test system of FIG. 3A.

Referring now to FIG. 3C, depicted is another embodiment of a testing system designed to automate the testing of the dispatch functionality of a communication network (e.g., communication system 100). In this embodiment, a plurality of dispatch subscriber units $102_1$-$102_n$ are connected in parallel with the electrically-controlled switch 320. As with the aforementioned embodiments, the testing unit 310 may be programmed to generate a series of dispatch test events that are comprised of closing and opening events, which in turn causes each of the plurality of dispatch subscriber units $102_1$-$102_n$ to transmit, over the dispatch network, dispatch call requests, voice data, or EOT signals to one or more target dispatch subscriber devices.

The dispatch test event data generated by the plurality of dispatch subscriber units $102_1$-$102_n$ may then be compared to the corresponding dispatch events that are recognized by one or more target dispatch subscriber units (e.g., target dispatch subscriber units 340). As described with reference to FIG. 3B, in one embodiment this means the reception times recorded in target log files may be compared with corresponding switch-open and switch-close durations recorded by the plurality of dispatch subscriber units $102_1$-$102_n$. In one embodiment, using a plurality of dispatch subscriber units $102_1$-$102_n$ in parallel, as shown in FIG. 3C, is intended to intentionally overload or stress a communication network in order to determine network efficiency, capacity, propagation delay, bandwidth, cell coverage and the like.

In one embodiment, the plurality of dispatch subscriber units $102_1$-$102_n$ of FIG. 3C may function as a bank of devices that are programmed to dispatch call a target bank of devices. This bank-to-bank calling is an effective way to intentionally stress a dispatch communication network to test one or more network characteristics. Alternatively, the plurality of dispatch subscriber units $102_1$-$102_n$ may all be programmed to call the same dispatch device.

Figure 3D:
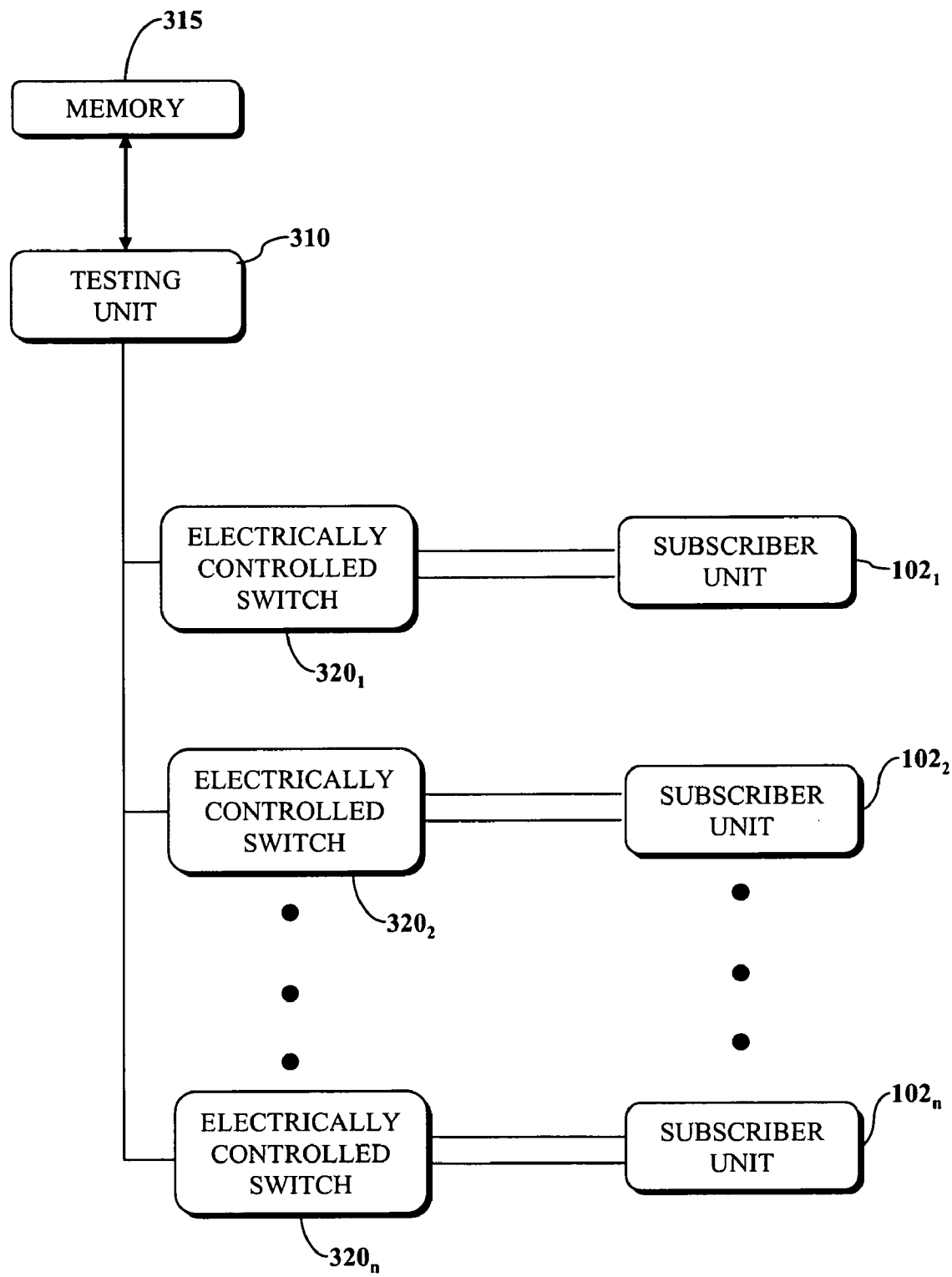
FIG. 3D depicts still another embodiment of the dispatch network test system of FIG. 3A.

Referring now to FIG. 3D, depicted is still another embodiment of a testing system designed to automate the testing of the dispatch functionality of a communication network (e.g., communication system 100). In this embodiment, a plurality of dispatch subscriber units $102_1$-$102_n$ are connected in series with a plurality of electrically-controlled switch $320_1$-$320_n$. In this embodiment, the testing unit 310 is programmed to generate a series of dispatch test events comprised of closing and opening events, which in turn actuates each of the plurality of electrically-controlled switch $320_1$-$320_n$ to cause the corresponding plurality of dispatch subscriber units $102_1$-$102_n$ to transmit, over the dispatch network, dispatch call requests, voice data, or EOT signals to one or more target dispatch subscriber devices.

As with the previous embodiments, the dispatch test event data generated by the plurality of dispatch subscriber units $102_1$-$102_n$ may then be compared to the corresponding dispatch events that are recognized by one or more target dispatch subscriber units. As before, the reception times recorded in target log files may be compared with corresponding switch-open and switch-close durations recorded by the plurality of dispatch subscriber units $102_1$-$102_n$. In one embodiment, using a plurality of dispatch subscriber units $102_1$-$102_n$ in series, as shown in FIG. 3D, is intended to intentionally overload or stress the communication network in order to determine network efficiency, capacity, propagation delay, bandwidth, cell coverage and the like.

As with the embodiment of FIG. 3C, the plurality of dispatch subscriber units $102_1$-$102_n$ of FIG. 3D may function as a bank of devices that are programmed to dispatch call a target bank of devices. This bank-to-bank calling is an effective way to intentionally stress a dispatch communication network to test one or more network characteristics. Alternatively, the plurality of dispatch subscriber units $102_1$-$102_n$ may all be programmed to call the same dispatch device. It should further be appreciated that each of the aforementioned plurality of electrically-controlled switch $320_1$-$320_n$ may in turn be connected to multiple dispatch devices.

Figure 4:
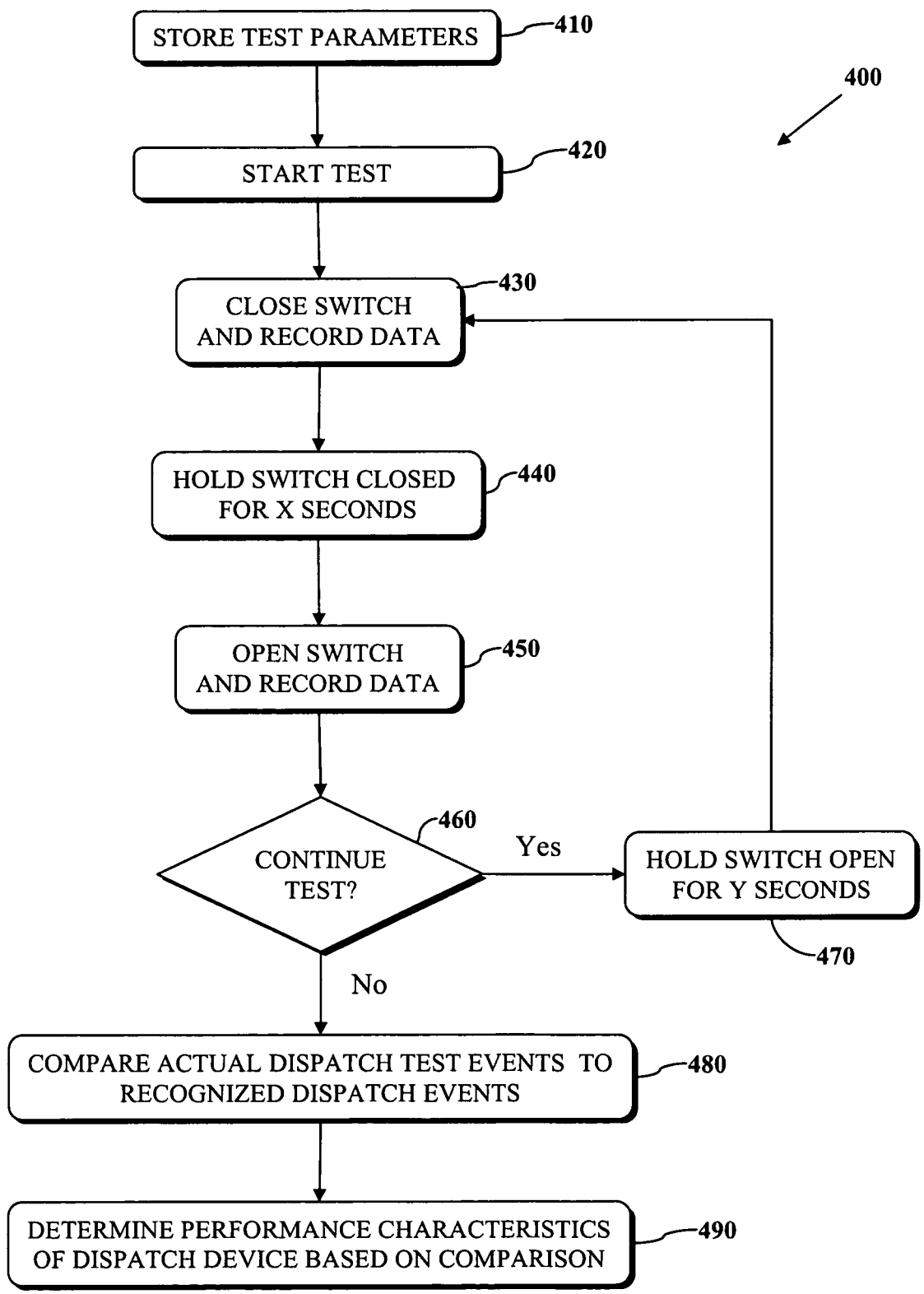
FIG. 4 is a flow diagram for testing the dispatch functionality of a dispatch device in accordance with one embodiment of the invention.

FIG. 4 displays an exemplary process 400 of how a dispatch network testing system (e.g. system 300) may be used to test operability of a dispatch subscriber unit (e.g., dispatch subscriber unit 102). In particular, process 400 begins at block 410 when a set of test parameters are entered into a testing unit (e.g. testing unit 310). In one embodiment, test parameters may include a switch-close duration, a switch-open duration, and a number of test iterations. In one embodiment, the switch-close duration represents the time during which an electrically-controlled switch (e.g. electrically-controlled switch 320) controlled by the testing unit is to remain closed during each test iteration. In contrast, the switch-open duration may represent the time during which the switch is to remain open during each test iteration. Similarly, the number of iterations represents the number of times the switch is to be closed and then opened during the test. It should be appreciated that the test parameters may be entered into the testing unit using a user interface and input device, or they may be pre-programmed into the testing unit.

Process 400 proceeds to block 420 where the test may be commenced. This may be accomplished by, for example, powering up a testing unit with pre-programmed test parameters or using an input device (e.g. switch, keyboard, mouse) to command the testing unit to begin the test. It should be appreciated that it may be desirable for the other components of the test system (e.g., electrically-controlled switch, dispatch subscriber unit, target dispatch mobile units, etc.) to be powered up before the test is started. In addition, the electrically-controlled switch should be open and the dispatch access number(s) of one or more target dispatch subscriber units may be set in the initiating dispatch subscriber unit so that a dispatch call request may be transmitted to the one or more target dispatch subscriber units when the electrically-controlled switch is first closed.

After the test has begun, process 400 may proceed to block 430 where a dispatch testing event may be generated by closing the electrically-controlled switch. This may be accomplished by transmitting, for example, a "close switch" control signal from the testing unit to the electrically-controlled switch. It should be appreciated that if a dispatch call session has not been established between the initiating dispatch subscriber unit and a target dispatch subscriber unit, then closing the electrically-controlled switch may cause the dispatch subscriber unit to transmit a dispatch call request, through the communication network, to the target dispatch subscriber unit. If, however, a dispatch call session has been established, then closing the electrically-controlled switch may cause the initiating dispatch subscriber unit to transmit, through the communication network, voice data to the target dispatch subscriber unit.

In addition to closing the electrically-controlled switch at block 430, this dispatch test event, if recognized by the dispatch subscriber unit, may be output through a data port of the dispatch subscriber unit and recorded in a log file (e.g., log file 330), as previously described. Alternatively, the data port may be connected to testing unit itself and may provide the accurately recognized dispatch event data directly to the testing unit. In either case, timestamp information or other data for the dispatch test event, if recognized, is recorded at block 430.

Process 400 proceeds to block 440 where the electrically-controlled switch may be held closed process for X seconds, where X refers to the switch-close duration of block 410. After X seconds, process 400 next proceeds to block 450 where another dispatch test event may be generated by opening the electrically-controlled switch. This may be accomplished by transmitting, for example, an "open switch" control signal from the testing unit to the electrically-controlled switch. At this point, the initiating dispatch subscriber unit may transmit, through the dispatch network, an EOT signal to the one or more target dispatch subscriber units if a dispatch call session between the initiating dispatch subscriber unit and the one or more target dispatch subscriber units has been established. In addition, at block 450 the timestamp and/or other information relating to this dispatch test event may be recorded in the manner discussed above.

After the electrically-controlled switch is opened, process 400 proceeds to block 460 where a determination of whether the test should continue may be made. In one embodiment, this determination may be made by comparing the number of close/open cycles performed since the start of the test (e.g. the number of times process 400 has looped through blocks 430 through 450) to the test parameter relating to the number of iterations provided at block 410. If the number of close/open cycles performed is less than the number of iterations test parameter, then the test may continue and process 400 proceeds to block 470. If, however, the number of close/open cycles performed so far is now equal to the number of iterations test parameter, then process 400 may continue to block 480.

In the case where the test is not completed, process 400 continues to block 470 where the electrically-controlled switch may be held open for Y seconds, where Y refers to the switch-open duration previously provided at block 410. Process 400 may then loop back to block 430 for another test iteration.

If, on the other hand, it is determined at block 460 that the test has been completed, process 400 continues to block 480 where the actual dispatch test events generated are compared to the recognized dispatch test events. In one embodiment, the actual dispatch test events are the timestamps of when the testing unit actuated the electrically-controlled switch in accordance with the user-defined test parameters. The recognized dispatch test events, on the other hand, are those events actually recorded by the dispatch hardware by outputting timestamp information through the unit's data port in the form of either a log file or a data stream (e.g., data 335) back to the test unit and/or transmitted to a computer in communication with the test unit.

Thereafter, at block 490, a determination may be made as to the performance characteristics of the dispatch device based on the comparison of block 480. In one embodiment, synchronization between the actual dispatch test event data and the recognized dispatch test event data may indicate that the dispatch hardware being tested is properly functioning. In contrast, a discrepancy between the actual dispatch test event data and the recognized dispatch test event data may indicate the dispatch hardware is malfunctioning.

While the process of FIG. 4 has been described with reference to testing the performance characteristics of a single dispatch device, it is equally applicable to the simultaneous testing of a plurality of dispatch devices.

Figure 5:
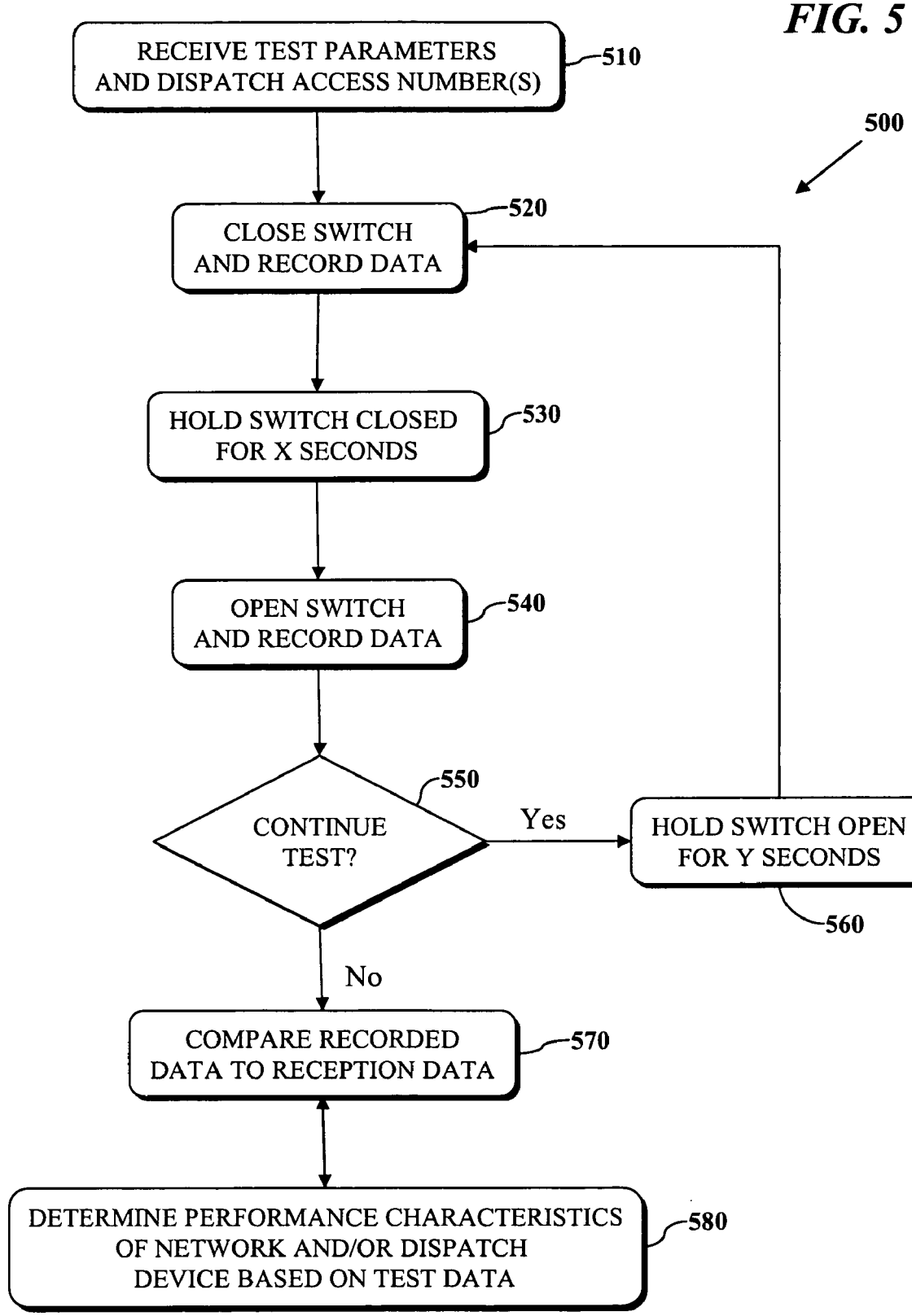
FIG. 5 is a flow diagram for testing the dispatch functionality of a communications network in accordance with one embodiment of the invention.

FIG. 5 displays an exemplary process 500 of how a dispatch network testing system (e.g. system 300) may be used to test the operability of a dispatch subscriber unit (e.g., dispatch subscriber unit 102) and/or the dispatch functionality of a communication network. In particular, process 500 begins at block 510 when a set of test parameters are received by a testing unit (e.g. testing unit 310) and at least one dispatch access number corresponding to target dispatch subscriber unit(s). In one embodiment, the test parameters may include a switch-close duration, a switch-open duration, and a number of test iterations as described above with reference to FIG. 4. It should be appreciated that the test parameters and/or the dispatch access number(s) may be entered into the testing unit using a user interface and input device, or they may be pre-programmed into the testing unit.

Process 500 proceeds to block 520 where the where a dispatch testing event may be generated by closing the electrically-controlled switch (e.g., transmitting a "close switch" control signal from the testing unit to the electrically-controlled switch). As with the process of process 400, it should be appreciated that if a dispatch call session has not been established between the initiating dispatch subscriber unit and a target dispatch subscriber unit, then closing the electrically-controlled switch may cause the dispatch subscriber unit to transmit a dispatch call request, through the communication network, to the target dispatch subscriber unit. If, however, a dispatch call session has been established, then closing the electrically-controlled switch may cause the initiating dispatch subscriber unit to transmit, through the communication network, voice data to the target dispatch subscriber unit.

In addition to closing the electrically-controlled switch at block 520, this dispatch test event, if recognized by the dispatch subscriber unit, may be output through a data port of the dispatch subscriber unit and recorded in a log file (e.g., log file 330), as previously described. Alternatively, the data port may be connected to the testing unit itself and may provide the accurately recognized dispatch event data directly to the testing unit. In either case, timestamp information or other data for the dispatch test event, if recognized, is recorded at block 520.

Process 500 proceeds to block 530 where the electrically-controlled switch may be held closed process for X seconds, where X refers to the switch-close duration parameter of block 510. After X seconds, process 500 next proceeds to block 540 where another dispatch test event may be generated by opening the electrically-controlled switch. This may be accomplished by transmitting, for example, an "open switch" control signal from the testing unit to the electrically-controlled switch. At this point, the initiating dispatch subscriber unit may transmit, through the dispatch network, an EOT signal to the one or more target dispatch subscriber units if a dispatch call session between the initiating dispatch subscriber unit and the one or more target dispatch subscriber units has been established. In addition, at block 540 the timestamp and/or other information relating to this dispatch test event may be recorded in the manner discussed above.

After the electrically-controlled switch is opened, process 500 proceeds to block 550 where a determination of whether the test should continue may be made. In one embodiment, this determination may be made by comparing the number of close/open cycles performed since the start of the test (e.g. the number of times process 500 has looped through blocks 520 through 540) to the test parameter relating to the number of iterations provided at block 510. If the number of close/open cycles performed is less than the number of iterations test parameter, then the test may continue and process 500 proceeds to block 560. If, however, the number of close/open cycles performed so far is now equal to the number of iterations test parameter, then process 500 may continue to block 570.

In the case where the test is not completed, process 500 continues to block 560 where the electrically-controlled switch may be held open for Y seconds, where Y refers to the switch-open duration previously provided at block 510. Process 500 may then loop back to block 520 for another test iteration.

If, on the other hand, it is determined at block 550 that the test has been completed, process 500 continues to block 570 where the actual dispatch test events that were generated may be compared to the recognized dispatch test events recorded by either i) the initiating dispatch hardware (e.g., dispatch subscriber unit 102), or ii) the target dispatch hardware (target dispatch subscriber unit 340). In the embodiment where the recognized dispatch test events according to the initiating dispatch hardware are used, the recognized dispatch test events are those events actually recorded by the initiating dispatch hardware by outputting timestamp information through the unit's data port in the form of either a log file or a data stream (e.g., data 335) back to the test unit and/or transmitted to a computer in communication with the test unit. Alternatively, where the recognized dispatch test events according to the target dispatch hardware are used, the recognized dispatch test events may be those events actually recorded by the target dispatch hardware by outputting timestamp information through the unit's data port (e.g., data port 380) in the form of either a log file (e.g., log file 390). In either case, the actual dispatch test events used are the timestamps of when the testing unit itself actuated the electrically-controlled switch in accordance with the user-defined test parameters.

Thereafter, at block 580, a determination may be made as to the performance characteristics of the communication network and/or the dispatch device based on the comparison of block 570. As with process 400 described above, synchronization between the actual dispatch test event data and the recognized dispatch test event data may indicate that the dispatch hardware and/or communication network is properly functioning. In contrast, a discrepancy between the actual dispatch test event data and the recognized dispatch test event data may indicate a malfunction.

For example, if the actual dispatch test event data does not match the recognized dispatch test event data recorded by the target device, but does match the recognized dispatch test event data recorded by the initiating dispatch hardware, a malfunction with the communication network may be the cause. In contract, if the actual dispatch test event data does not match the recognized dispatch test event data recorded by the target device, nor the recognized dispatch test event data recorded by the initiating dispatch hardware, a malfunction with the initiating dispatch hardware may be the cause. It should be appreciated that other data comparisons may be performed to pinpoint potential system and/or hardware malfunctions.

While process 500 has been described in terms of a single initiating dispatch subscriber unit and a single target dispatch subscriber unit, it is equally applicable to a plurality of initiating dispatch subscriber units and/or a plurality of target dispatch subscriber units. For example, at block 520 a plurality of control signals may be generated by closing a plurality of electrically-controlled switches, such as the previously-described plurality of electrically-controlled switch $320_1$-$320_n$. Alternatively, a single control signal may be used to actuate a single electrically-controlled switch to which a plurality of plurality of dispatch subscriber units $102_1$-$102_n$ are connected, as in FIG. 3C above.

While processes 400 and 500 have been described in the above embodiments, it should be appreciated that these are for exemplary purposes only and other embodiments are applicable to the invention. For the sake of simplicity, processes 400 and 500 have been defined in general steps and it should be appreciated that other steps consistent with the principles of the invention may be included. Moreover, while the invention has been described in connection with various embodiments, it should be understood that the invention is capable of further modifications. This disclosure is intended to cover any variations, uses or adaptation of the invention following, in general, the principles of the invention, and including such departures from the present disclosure as come within the known and customary practice within the art to which the invention pertains.

What is claimed is:

1. A method for automating dispatch communication testing comprising the acts of:
   storing user-defined test parameters in a memory of a testing unit;
   actuating automatically by the testing unit a switch coupled to an initiating dispatch device to automatically generate one or more dispatch test events in accordance with said test parameters;

recording in the memory of the testing unit test data representative of said one or more dispatch test events;

comparing said recorded test data to one or more corresponding recognized dispatch events; and determining a performance characteristic of at least one of the initiating dispatch device and a communication network based on said comparing to determine whether the at least one of the initiating dispatch device and the communication network is functioning properly.

2. The method of claim 1, wherein said test parameters include one or more of a switch-close duration, a switch-open duration and a number of iterations, wherein said switch-close duration represents how long said switch is to be held closed, and said switch-open duration represents how long said switch is to be held open.

3. The method of claim 1, wherein actuating the switch comprises providing a first control signal to close said switch for a first period of time, where closing said switch causes said initiating dispatch device to transmit at least one of a dispatch call request and voice data over the communication network to a target dispatch device.

4. The method of claim 3, wherein actuating the switch further comprises providing a second control signal to open said electrically-controlled switch for a second period of time which is based on said test parameters, where opening said switch causes said initiating dispatch device to transmit an end-of-transmission signal over the communication network to a target dispatch device.

5. The method of claim 1, wherein recording test data comprises recording timestamp information of when said one or more dispatch test events actually occurred.

6. The method of claim 1, wherein said recognized dispatch events comprises a set of dispatch activities performed by said dispatch device in response to said actuation of the switch.

7. The method of claim 6, wherein determining the dispatch performance characteristic comprises determining whether said set of dispatch activities matches said one or more dispatch test events, wherein a match is indicative that the initiating dispatch device is functioning properly.

8. The method of claim 1, wherein said recognized dispatch events comprises a set of dispatch activities recorded by a target dispatch device as a result of transmission from said initiating dispatch device due to said actuation of the switch.

9. The method of claim 8, wherein determining the dispatch performance characteristic comprises determining whether said set of dispatch activities matches said one or more dispatch test events, wherein a match is indicative that the communication network is functioning properly.

10. The method of claim 1, wherein actuating the switch comprises simulating a user request to perform a dispatch function by automatically actuating an electrically-controlled switch.

11. The method of claim 1, further comprising generating a log of the recognized dispatch events using a data port of the initiating dispatch device.

12. The method of claim 1, wherein actuating the switch comprises actuating the switch when coupled to a plurality of initiating dispatch devices, each of which are to automatically generate said one or more dispatch test events.

13. The method of claim 1, wherein actuating the switch comprises actuating a plurality of switches each of which are coupled to one or more initiating dispatch devices that are each to automatically generate said one or more dispatch test events.

14. A method for testing at least one of an initiating dispatch device and a communication network with which said dispatch device is in communication, the method comprising the acts of:

actuating automatically by a testing unit a switch coupled to the initiating dispatch device to automatically generate one or more dispatch test events in accordance with user-defined test parameters;

recording in a memory of the testing unit test data representative of said one or more dispatch test events;

comparing said recorded test data to one or more corresponding recognized dispatch events; and determining that at least one of the initiating dispatch device and the communication network are properly functioning when said recorded test data matches the one or more corresponding recognized dispatch events.

15. The method of claim 14, wherein actuating the switch simulates a user depressing a dispatch call button of the initiating dispatch device.

16. The method of claim 14, wherein said test parameters include one or more of a switch-close duration, a switch-open duration and a number of iterations, wherein said switch-close duration represents how long said switch is to be held closed, and said switch-open duration represents how long said electrically-controlled switch is to be held open.

17. The method of claim 14, wherein actuating the switch comprises providing a first control signal to close said switch for a first period of time, where closing said switch causes said initiating dispatch device to transmit at least one of a dispatch call request and voice data over the communication network to a target dispatch device.

18. The method of claim 17, wherein actuating the switch further comprises providing a second control signal to open said switch for a second period of time which is based on said test parameters, where opening said switch causes said initiating dispatch device to transmit an end-of-transmission signal over the communication network to a target dispatch device.

19. The method of claim 14, wherein recording test data comprises recording timestamp information of when said one or more dispatch test events actually occurred.

20. The method of claim 14, wherein said recognized dispatch events comprises a set of dispatch activities recorded by a target dispatch device as a result of transmission from said initiating dispatch device over the communication network due to said actuation of the switch.

21. The method of claim 14, further comprising generating a log of the recognized dispatch events using a data port of the initiating dispatch device.

22. The method of claim 14, wherein actuating the switch comprises actuating the switch when coupled to a plurality of initiating dispatch devices, each of which are to automatically generate said one or more dispatch test events.

23. The method of claim 14, wherein actuating the switch comprises actuating a plurality of switches each of which are coupled to one or more initiating dispatch devices that are each to automatically generate said one or more dispatch test events.

24. A system for automating dispatch communication testing, the system comprising:

an initiating dispatch device;

an electrically-controlled switch coupled to the initiating dispatch device; and a testing unit comprising a processor and a memory, the memory containing one or more instruction sequences to cause the testing unit to:

actuate said switch to simulate one or more dispatch test events in accordance with user-defined test parameters, record test data representative of said one or more dispatch test events, and compare said recorded test data to one or more corresponding recognized dispatch events to determine whether the at least one of the initiating dispatch device and a communication network with which the initiating dispatch device is in communication is functioning properly.

25. The system of claim 24, wherein said test parameters include one or more of a switch-close duration, a switch-open duration and a number of iterations, wherein said switch-close duration represents how long said switch is to be held closed, and said switch-open duration represents how long said electrically-controlled switch is to be held open.

26. The system of claim 24, wherein actuating the switch comprises providing a first control signal to close said switch for a first period of time which is based on said test parameters, where closing said switch causes said initiating dispatch device to transmit at least one of a dispatch call request and voice data over a communication network to a target dispatch device.

27. The system of claim 26, wherein actuating the switch further comprises providing a second control signal to open said switch for a second period of time which is based on said test parameters, where opening said switch causes said initiating dispatch device to transmit an end-of-transmission signal over the communication network to a target dispatch device.

28. The system of claim 24, wherein recording test data comprises recording timestamp information of when said one or more dispatch test events actually occurred.

29. The system of claim 24, wherein said recognized dispatch events comprises a set of dispatch activities recognized by a target dispatch device as a result of transmission from said initiating dispatch device over the communication network caused by actuating the switch.

30. The system of claim 24, further comprising a plurality of initiating devices each of which are coupled to said electrically-controlled switch.

31. The system of claim 24, further comprising:
a plurality of initiating dispatch devices; and
a plurality of electrically-controlled switches coupled to said plurality of initiating dispatch devices.

* * * * *